July 10, 1934.  L. F. HUNT ET AL  1,965,896
SYSTEM FOR POWER LINE PROTECTION
Filed Aug. 30, 1933  2 Sheets-Sheet 1
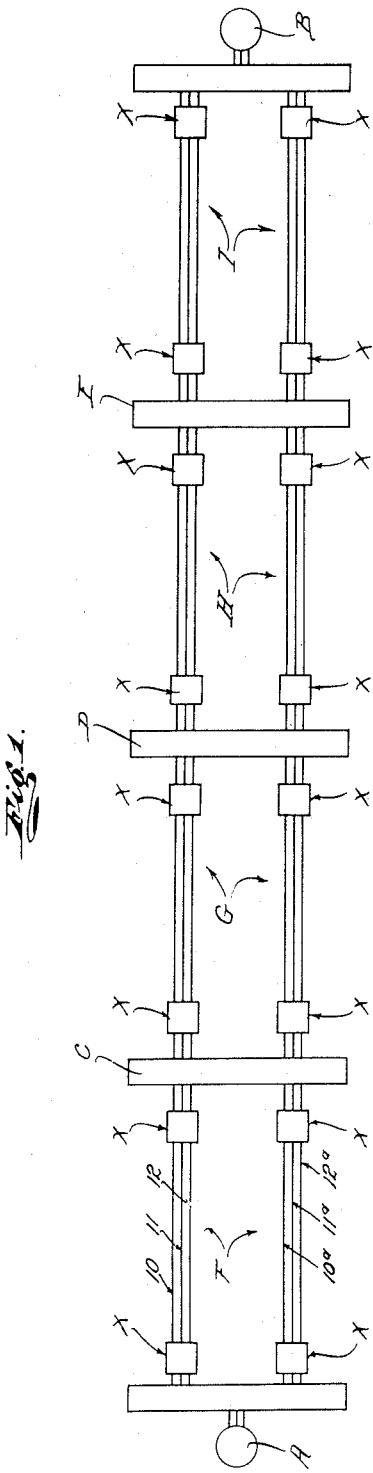
Inventors
Lloyd F. Hunt
and Fred B. Doolittle
Their Attorney

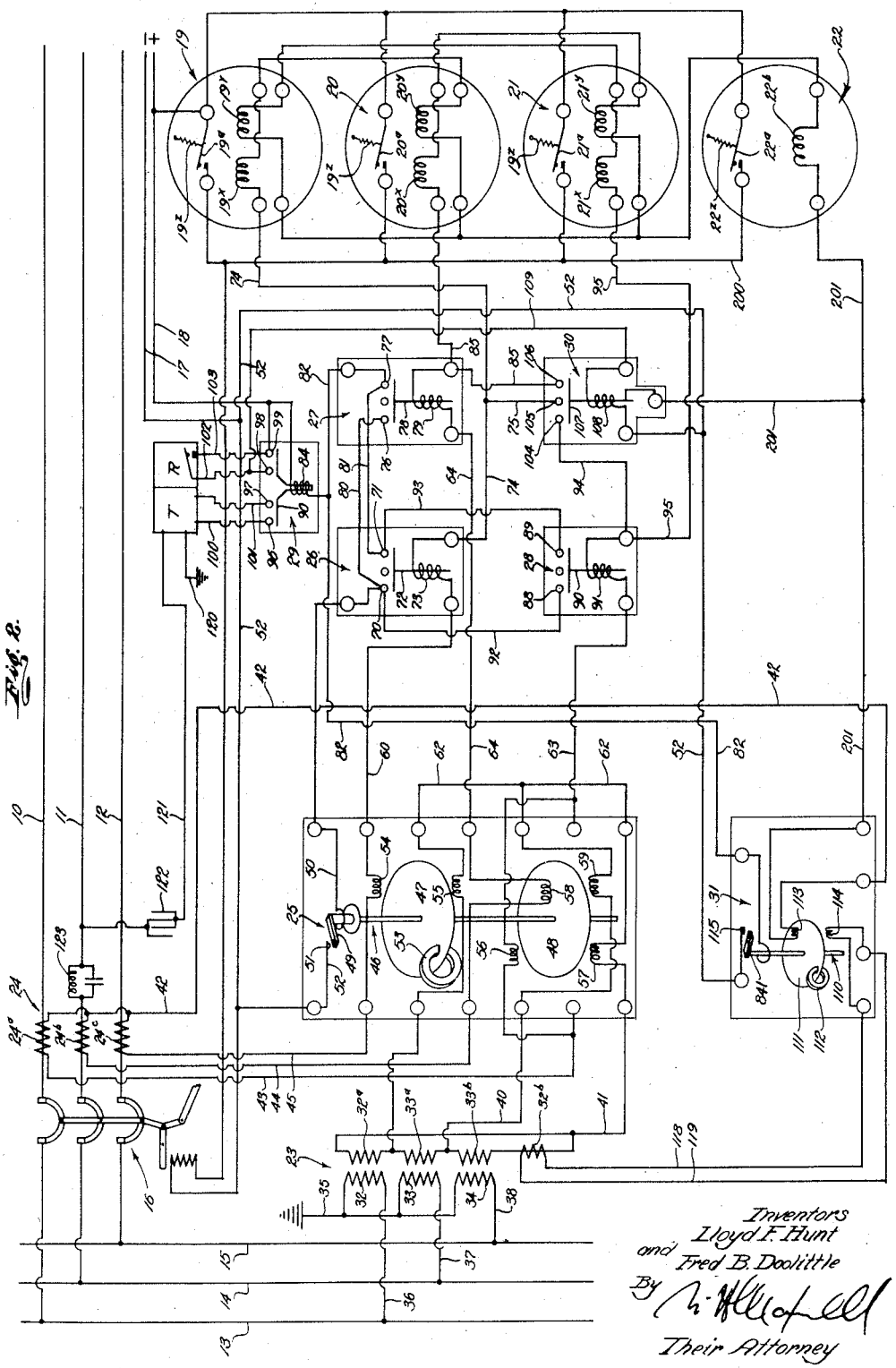

UNITED STATES PATENT OFFICE 1,965,896

SYSTEM FOR POWER LINE PROTECTION

Lloyd F. Hunt and Fred B. Doolittle, Glendale, Calif.

Application August 30, 1933, Serial No. 687,446

6 Claims. (Cl. 175—294)

This invention relates to a system for line protection and has particular reference to a system for protecting power lines or power distributing systems. It is a general object of the invention to provide a simple effective and improved line protecting system particularly adapted to handle conditions such as most frequently occur under actual operating conditions.

The present invention relates, generally, to the type of control or protective system which is the subject of our copending application entitled System for power line protection, Serial No. 609,662, filed May 6, 1932, in which application our system is broadly claimed.

The usual power system is an alternating current system involving two or more spaced generators or synchronous machines connected by transmission lines. It is common to provide the usual power system with control or protective means designed to disconnect the lines when fault or overload conditions occur. With the usual protective systems the lines are disconnected or cut out not only when faults occur but also when the synchronous machines fall out of step with each other as such occurrence causes a line condition corresponding to a balanced fault condition. When the spaced synchronous machines are running out of step with each other there is a particular point on the intervening transmission system toward which power will flow from both sources at the same instant. When the machines in a system get out of step and the point just mentioned, known as the reactance center of the system, falls within a section of transmission line equipped with a protective system, such as we set forth in our co-pending application above identified, or any system depending upon the correct functioning of power directional relays, there is considerable probability that the line will cut out or relay falsely. That is to say, that under out of step conditions there are intervals during the slip cycle when the current in the line which bridges the reactance center will affect the relays as though a three phase fault were on the line when actually there is no fault.

Records of faults on transmission systems show a very small percentage of balanced three phase short circuits which system instability or out of step conditions are of much more frequent occurrence. During instability it is extremely desirable to maintain all sound transmission line sections in service. With the systems heretofore available it has been impossible to distinguish by relays between a balanced three phase fault on a transmission line and a sound line bridging the reactance center of an out of step system.

By our present invention we provide a protective system that does not cut out a line under a balance fault condition or under out of step condition. In practice it is desirable to sacrifice clearing balanced three phase faults, which are of rare occurrence, in favor of maintaining transmission capacity in service during instability.

An object of our present invention is to provide a relay system of line protection of the general type set forth in our above mentioned co-pending application improved so that it will not respond to balanced three phase faults or system instability, but will effectively select and clear, from the protected system, sections of transmission line involved in any fault other than balanced three phase without the necessity of cascading time delay for selection.

Various objects and features of our invention will be best and more fully understood from the following detailed description of a typical form and application of the invention throughout which description we will refer to the accompanying drawings in which:

Fig. 1 is a general diagrammatic view of a power system employing a protective system of the present invention and Fig. 2 is an enlarged diagrammatic view illustrating the details of a single unit of the system.

The protective system contemplated by our present invention is applicable, generally, to power distributing systems, and may be applied to advantage to power systems in which the power is handled through the various wiring systems usually employed in handling electrical energy. It is to be understood, that in applying the invention to power distributing systems of various types, certain modifications and variations may be necessary. Further, the present invention is primarily concerned with a protective system and not with details of units of equipment such as individual relays, transformers, circuit breakers, etc., that may enter into an embodiment of the invention. In setting forth the invention, reference is being made to particulars of certain relays and other part, primarily for the purpose of setting forth an application of the invention, and such reference is therefore not to be construed as limiting the scope or nature of the invention. In the drawings to which reference will be made, we have illustrated in Fig. 2, a unit of a protective system embodying the invention, and have illustrated various devices or parts in such system in a general or diagrammatic form in order to avoid needless and confusing details such as might appear were the individual devices set forth in detail.

In the diagram Fig. 1 we disclose a power system of a type and arrangement commonly employed by power distributing companies. We have, in this diagram, illustrated two spaced sources of power A and B connected by multiple power lines illustrated as main conductors 10, 11 and 12 of one circuit, and $10^a$, $11^a$ and $12^a$ of a parallel circuit, the circuits being three phase circuits. Each circuit between the sources of power A and B is divided into several sections F, G, H and I by means of substations C, D, and E.

In accordance with the general principles of the present invention, a unit X of protective equipment is employed at each end of each section of the power circuit, the several units X of the protective system being inter-connected through a signaling system as will be hereinafter more fully described. We will first set forth in detail a single unit X of the protective system, that is, a unit such as occurs at each end of each section of the main circuits, it being understood that such description applies equally to all of the protective units in the system.

Referring now to Fig. 2 of the drawings, wherein we illustrate one complete unit X of the system of our invention, we will first designate the main or principal parts. The unit about to be described being located at one end of one section of the power system is shown in combination with the main lines 10, 11 and 12 of one of the main circuits, and substation bus-bars 13, 14 and 15 connected with the lines 10, 11 and 12, respectively.

The unit involves a circuit breaker 16 connected to the main lines 10, 11 and 12 immediately ahead of the connection of such lines with the bus-bars 13, 14 and 15. The circuit breaker 16 is adapted to be operated by a battery or other power circuit of the sub-station. In the diagram it is shown connected for operation by current carried by lines 17 and 18. The breaker operating circuit includes a plurality of relays which control current carried by the lines 17 and 18, and which are governed by the control means of the present invention as will be hereinafter described. In the particular application of the invention being set forth, we illustrate three overload time delay relays 19, 20 and 21, and a short time delay over-current ground relay 22 connected in the circuit carried by lines 17 and 18 so that the closing of any one of the said relays completes the circuit and results in operation of the circuit breaker 16.

In accordance with a typical embodiment of the present invention, the overload relays 19, 20 and 21 are of the balanced current type. As illustrated diagrammatically in Fig. 2 of the drawings relays 19, 20 and 21 have closing coils $19^x$, $20^x$ and $21^x$ respectively, and restraining coils $19^y$, $20^y$ and $21^y$ respectively, connected by suitable lines with the actuating circuit or other relays of the protective system as will be herinafter described, so that under normal operation current from one phase flows through the closing coil of each relay in a direction to cause its contacts to close while current from another phase flows through the restraining coil in a direction to restrain or prevent the closing of the relay contacts. The relays 19, 20, 21 and 22 have contacts $19^a$, $20^a$, $21^a$ and $22^a$ respectively, for controlling the circuit to the circuit breaker 16. The relay contacts may be normally maintained in open position by spring $19^z$ assisted by current in the restraining coils, if current is flowing. The relay contacts close preferably with time delay, when current in the closing coil is sufficiently in excess of the current in the restraining coil to overpower the restraining action of the restraining coil and the spring holding the contact.

Relay 22 has contact $22^a$ normally held open as by the action of a spring $22^z$ and has a winding or coil $22^b$ controlling the contact $22^a$.

The control means of the present invention involves parts which connect the circuit breaker controlling relays 19, 20, 21 and 22 with the lines 10, 11 and 12 of the main power line so that a fault or predetermined disturbance in the circuit of the main line causes operation of one of the said relays and it further includes means inter-connecting the units X at the several ends of the several main circuit sections.

The control means of the present invention as illustrated in the diagram Fig. 2 includes a potential transformer 23 and a current transformer 24 both connected for energization by the main power circuit. The current transformer 24 is shown applied to the main power lines 10, 11 and 12, while the potential transformer is shown connected with the bus-bars 13, 14 and 15. A directional relay 25 responsive to direction of three phase power flow is connected with the transformers and with fast over-current relays 26, 27 and 28. A lock-out relay 29 is operated through the contacts of the relays just mentioned to start the signal transmitter T through contacts 96 and 97 and to energize the coil of a cutout relay 30 through contacts 98 and 99. The relay 30 is provided to cut out, prevent or in any suitable manner acts so that the tripping relays do not function. In the arrangement illustrated, the closing of the contacts of cut-out relay 30, cuts out relays 19, 20, 21 and 22 by short circuiting the coils of relay 19 through contacts 105 and 107, of relay 20 through contacts 106 and 107, of relay 21 through contacts 104 and 107, and relay 22 through the combination of contacts 104, 105 and 106 with 107. It will be obvious that corresponding results may be obtained in various manners as by opening the circuit to a wound shading pole, applying electrical energy to an auxiliary restraining or snatch-back coil or by direct mechanical action. A directional residual relay 31 is energized with residual voltage from the delta connected secondary of the potential transformer 23 by means of a transformer $32^b$ through which the delta is closed, and with residual current from the current transformer, star connected after passing through relays 25, 26, 27, 28, and 19, 20, 21 and the residual lead through relay 22 and 31 and back to the common point of the three current transformers.

The potential transformer 23 may have three primary windings, 32, 33 and 34, each having one pole connected to ground through a connection 35 and having their other poles connected to the bus-bars 13, 14 and 15 by connections 36, 37 and 38, respectively. Secondary windings $32^a$ and $33^a$ and $33^b$ are related to the primary windings 32, 33 and 34, respectively. The windings $32^a$ and $33^a$ are connected together and to a line 39 which extends from the transformer 23 to one potential coil, 55, of the directional relay 25. Winding $33^a$ and $33^b$ are connected together and to a line 40 which connects with another potential coil 59, of the directional relay 25. Windings $32^a$ and $33^b$ are connected together and to a line 41 which connects with another potential coil, 57, of the directional relay 25. The winding 32$^b$ hereinabove mentioned is arranged to be excited by flow in the delta formed by the inter-connection of 32$^a$, 33$^a$ and 33$^b$, as will be apparent from the diagram.

The current transformers 24 include, primarily, three windings 24$^a$, 24$^b$ and 24$^c$ related to the main lines 10, 11 and 12 respectively. One pole of each winding is connected to a common line 42 which extends from the current transformers to the relay 31. The other poles of the windings 24$^a$, 24$^b$ and 24$^c$ connect to lines 43, 44 and 45 respectively, which connect to current coils of the relay 25 as will be hereinafter described.

The power directional relay 25 illustrated diagrammatically in the drawings includes, generally, a unit 46 mounted for rotation, which unit carries discs 47 and 48, and a contact 49. The contact 49 is connected with a line 50 and is adapted to cooperate with a contact 51 connected by a line 52 with one side of the operating circuit of the sub-station. The rotation of the unit 46 is damped by a fixed field element 53 related to the disc 47, and the direction of torque on the unit 46 is governed by windings 54 and 55 related to the disc 47, and windings 56, 57, 58 and 59 related to the disc 48. One pole of the winding 54 is connected with the line 45 from the transformer 24$^c$, while the other pole of the winding 54 is connected with relay 26 by line 60. One pole of the winding 56 is connected with the line 43 from the transformer 24$^a$, while the other pole of the winding 56 is connected with the relay 28 by a connection 63. One pole of the winding 58 is connected with line 44 from the transformer 24$^b$ while the other pole of the winding 58 is connected with relay 27 by line 64.

The relay 26 is a fast or instantaneous over-current relay including stationary contacts 70 and 71, and a movable contact 72 controlled by winding 73. The contact 70 is connected with line 50 from the relay 25, while the contact 71 is connected with relay 27 by a line 81. One pole of the relay winding 73 is connected with the line 60 from the relay 25, while the other pole connects with lines 74 and 75 which connect with relays 19 and 30, respectively.

The relay 27 is a fast or instantaneous over-current relay including stationary contacts 76 and 77, a movable contact 78, and a winding 79 controlling the contact 78. The contact 76 is connected with the contact 70 of relay 26 by a line 80, while the contact 77 is connected with contact 71 of relay 26 by line 81 and with a line 82 which extends to a winding 84 of relay 29 and to the movable contact 841 of relay 31. One pole of the winding 79 is connected with the line 64 from relay 25, while the other pole is connected with the relay 30 by a line 85. The relay 28 is a fast or instantaneous over-current relay having stationary contacts 88 and 89 and a movable contact 90 controlled by winding 91. The contact 88 is connected to contact 70 of relay 26 by a line 92, while contact 89 is connected with contact 71 of relay 26 by line 93. One pole of the winding 91 is connected with line 63 from relay 25, while the other pole of the winding 91 is connected with the relay 30 by line 94, and to relay 21 by line 95.

The lock-out relay 29 includes stationary contacts 96, 97, 98 and 99, a movable contact 90, and the winding 84. The contacts 96 and 97 are connected by means of line 100 and 101 with a signal transmitter T, while the contacts 98 and 99 are connected by means of lines 102 and 103 in parallel with the contacts of a signal receiver R and the contact 98 is also connected by line 109 to coil 108 of relay 30.

The cut out relay 30 includes stationary contacts 104, 105 and 106, a movable contact 107 and a winding 108. The contact 104 is connected with line 94 from the winding of relay 26. The contact 105 is connected with line 75 from relay 26, while contact 106 is connected with line 85 from relay 27. One pile of the winding 108 is connected with one side of the sub-station circuit by line 52, while the other pole is connected with line 102 to the receiver R by a line 109.

The ground relay 31 includes a rotatable unit 110 carrying a contact 841 and a disc 111. The rotation of the unit 110 is damped by a fixed field piece 112 and the direction of torque on 110 is governed by windings 113 and 114. The contact 841 is adapted to cooperate with a fixed contact 115 connected with line 52. The contact 841 is connected with the relay 27 by line 82. The winding 113 has one pole connected with line 201 from relay 22 and has the other pole connected with line 42 from transformers 24. The winding 114 has one pole connected with one pole of the winding 32$^b$ by line 118 and has the other pole connected to the other pole of the winding 32$^b$ by line 119.

The inter-connection between the units of the control system located at the ends of each section of the power line is an important and outstanding feature of the system, as it makes possible the total elimination of the time delay factor required for proper selectivity in systems heretofore used. We have found in practice, that it is advantageous to employ a wired radio connection, it being understood, however, that any other signaling connection may be employed without departing from the principles of the present invention.

In the form of the invention illustrated in the drawings, there is a signal transmitter T and a signal receiver R at each unit as above described. The transmitter T and receiver R have one pole connected to ground through a ground connection 120 and the other connected with one of the main lines of the power circuit, for instance, the line 11 through a connection 121 provided with a coupling capacitor 122, the line 11 being provided with a radio frequency trap 123.

The transmitters and receivers of the units X at the two ends of each section are connected either by wired circuits, by carrier current, or by other means and are isolated or separated from the transmitters and receivers of the other units X of the system so that a signal sent by a transmitter in any one section operates only the receiver at the opposite end of that section. We have shown tuned traps 123 of the unit X for confining the signals to the desired section of the system.

The protective system of the present invention as above described is responsive to various fault conditions in the main power circuit and is selective to disconnect only the section of the power circuit in which the fault occurs.

I. Unbalanced three phase fault.
II. Phase to phase fault.
III. Two phase to ground fault.
IV. One phase to ground with high fault resistance.
V. One phase to ground with low fault resistance.

I. Assume the three main conductors 10, 11 and 12 short circuited in section H of Fig. 1 to cause an unbalanced three phase fault, the equipment at stations D and I associated with the circuit breakers connecting line section H to the station busses will perform as follows:

Referring to Fig. 2, overload current will flow from the station busses 13, 14 and 15 through circuit breaker 16, through current transformer 24, and thence via the main line to the short circuit. The short circuit current through current transformers 24 will induce heavy unbalanced secondary current in windings 24a, 24b and 24c which connect through the current coils of relay 25, 26, 27 and 28 and through the coils of relays 19, 20 and 21. Since the fault current flows from the bus to the short circuit, the direction of the secondary current in 24a, 24b, and 24c is such that, in passing through the current coils 54, 58 and 56 of power directional relay 25, it tends to rotate element 46 in the direction that holds contacts 49 and 51 open. In passing through the coils of relays 26, 27 and 28 the current will close the contacts of these relays, but since the contacts of relays 26, 27 and 28 are in series with the contacts of relay 25 which are open, nothing further occurs. Since the contacts of relay 30 are open, the current from the coils of 26, 27 and 28 cannot pass through lines 75, 85 and 94 but must go on through the coils of relays 19, 20 and 21 causing them to be energized but unbalanced and with the result that at least one of them closes its contact after a slight time delay. Closing of the contact of relays 19, 20 or 21 will energize the trip coil of circuit breaker 16 from the station operating circuit carried by lines 17 and 18, thus opening circuit breaker 16 and clearing the faulted section of line from the bus, 13, 14 and 15. The action just described takes place in the equipment at both ends of line section H thus clearing from the system, section H of Fig. 1, which was assumed to contain the three phase fault.

If the three phase fault is balanced or if the currents in the protective system are due to instability in the main power line, the current in the closing coils and in the restraining coils of the relays 19, 20 and 21 will balance and therefor the contacts of the relays 19, 20 and 21 will not be closed.

In order that the other sections of line F, G and I shall not trip out due to an unbalanced three phase fault in section H the equipment at the ends of these sections must function. For the purpose of illustration this action will be described at the ends of section G, the functioning for the other unfaulted sections being similar to that for G.

Referring to Figs. 1 and 2 in the unit X controlling section G at station D, the fault current will be flowing from source A through station C, lines 10, 11, 12 through current transformers 24, circuit breaker 16 to bus 13, 14 and 15 at station D and thence out on section H to the three phase fault. The current flowing toward the bus through current transformers 24 will induce heavy secondary currents in windings 24a, 24b and 24c which connect through current coils of relays 25, 26, 27, 28, 19, 20 and 21 to the common wire 200. Since the fault current in this case is flowing toward the bus through current transformers 24, the direction of the secondary current in 24a, 24b and 24c is such that in passing through the current coils 54, 58 and 56 of the power directional relay 25, it tends to rotate element 46 in the direction to close contacts 49 and 51. Likewise in passing through the coils of relays 26, 27 and 28 the current will cause the closing of these relay contacts. We have now energized the coil of relay 29 from the operation circuit of the station through contacts 51 and 49 of relay 25, contacts 70 and 71 of relay 26 (and/or contacts 88 and 89 of relay 28, and/or contacts 76 and 77 of relay 27) through line 82 and coil 84 of relay 29 and to the other side of the source 18. Relay 29 will now close contacts 98 and 99 energizing the coil of relay 30 from the operating circuit of the station through contacts 98 and 99, line 109 coil 108 of relay 30 and by line 52 back to line 17 of station operating circuit. Since the coil of relay 30 is now energized it will close its contacts 104, 105, 106 and 107 thus connecting together lines 75, 85, 94 and 201 which provides a path for the current from current transformer secondaries 24a, 24b and 24c, through coils 54, 58 and 56 of relay 25, and the coils of relays 26, 27 and 28, the contacts of relay 30 back to the current transformers 24 via line 201, coil 113 of relay 31 and line 42, without going through the coils of relays 19, 20, 21 and 22 which therefore do not close their contacts. It will be noted that until the above sequence is completed and the contacts of relay 30 are closed, the coils of relays 19, 20, 21 and 22 are in the current transformer secondary circuit and are energized. For this reason, relays 19, 20, 21 and 22 are set with sufficient time delay that the contacts of relay 30 will be closed, cutting out the coils of relays 19, 20, 21 and 22 before their contacts shall have had time to close. Since the contacts of 19, 20, 21 and 22 do not close, the trip coil of circuit breaker 16 is not energized and the circuit breaker 16, connecting line section G to station D remains closed.

In order that line section G remain in service, it is necessary that the circuit breaker controlling this section at station C also remain closed. We will now refer to the breaker and unit at station C. It will be remembered that the operation of relay 29 on this line section at station D, started operation of a signal transmitter T. This signal is received at station C by means of the receiver R which closes its contacts connecting leads 102 and 103 which energizes coil 108 of relay 30 from line 18 of the station operating circuit through line 103, the contacts of R, line 102, line 109 coil 108 and line 52 back to the other side 17 of the station operating circuit. The coil of relay 30 being energized results in the closing of its contacts, 104, 105, 106 and 107 cutting out the coils of relays 19, 20, 21 and 22 before the contacts of these relays shall have had time to close as described above. At station C, the direction of the fault current through current transformer 24 is toward the fault in section H so that the directional relay contacts of relays 25 and 31 remain open, therefore it is necessary to depend upon the signal transmitted from station D to hold in circuit breaker 16 at station C.

II. A phase to phase fault in section H assuming conductors 10 and 11 to be short circuited will be cleared by the units X at the ends of section H. In this case the operation is the same as for the unbalanced three phase fau't above described except that there will be overload currents induced in but two of the secondaries of current transformers 24 these being 24a and 24b for the fault between line conductors 10 and 11. The contacts of relay 25 will remain open, the contacts of relays 28 and 27 will close but will not complete any circuit since these contacts are in series with the contacts of relay 25. The operating coils of relays 20 and 21 will carry overcurrent and the restraining coil of 21 will also carry overcurrent. However, the restraining coil of 20 does not carry overcurrent for a fault between 11 and 12 and relay 20 will close its contacts which will trip the circuit breakers 16 at the ends of section H. Since the fault is between phases, no ground being involved, there will be no residual current to return through relays 22 and 31 and hence the contacts of these relays will remain open.

For the phase to phase fault in section H, the protective equipment in the other line sections must prevent their automatic disconnection from the system. The relay action is exactly the same as for the unbalanced three phase fault except that in this case there will be current in only two of the three current coils of relay 25 and only relays 28 and 27 will close contacts. However, this completes the circuit energizing relay 29 which accomplishes the cutting out of relays 19, 20, 21 and 22 at the near end through relay 30 and at the far end by means of the transmitted signal exactly in the same manner as this was done in the case of the three phase fault previously described.

III. In the case of the two phase to ground fault, the phase relays will function at the various locations exactly as described for the phase to phase fault but in this case the fault is also to ground and therefore the residual relays 22 and 31 are energized. The contacts of relay 31 control the same circuit as the contacts of relays 25 and 26 (and/or 27 and/or 28) in series and for this type of fault the contacts of relay 31 will be closed or open respectively at the same stations as the contacts of relay 25 are closed or open so the functioning of the protective system will be the same as for the phase to phase fault previously described.

IV. In case the main line conductor 10, in section H is faulted to ground through a high resistance and assume that the conditions of the system are such that three phase power is flowing from station D to section I through the faulted line section H and that the amount of this three phase power is in excess of the single phase fault power flowing away from station E to the high resistance fault in line section H.

In the case of the unit X in line section H at station E of Fig. 1, the three phase load power will be flowing toward station E bus and therefore relay 25 will close its contacts but the magnitude of the currents through the coils of relays 26, 27 and 28 will be so small that none of these relay contacts will close. Experience has shown that if the minimum operating current settings of relays 26, 27 and 28 are well in excess of any load currents which must be transmitted through this line section, these relays will not close their contacts for ground faults of high enough resistance that the load currents predominate over the ground fault current in determining the direction of the resultant torque on element 46 of relay 25. Since relays 26, 27 and 28 are open for this fault condition relay 29 will not be energized through the contacts of relays 25, 26, 27 and 28.

Since this is a ground fault, there will be residual current through coil 113 of relay 31, but this will be in the direction to hold the contacts of relay 31 open and therefore relay 29 will not be operated through these contacts. Since relay 29 is not operated through either of the possible paths, and no signal is received from the equipment at station D as will presently be shown, relay 30 does not operate and circuit breaker 16 is opened after slight time delay by the closing of the contacts of residual overload relay 22. This clears the faulted section of line H from station E.

Now considering the unit X in section H at station D of Fig. 1. At this unit both the three phase power flow to the load and the single phase current flow to the fault will be away from the station bus. Therefore neither relay 25 nor 31 will close contacts and relays 29 and 30 will not be energized and transmitter T will not transmit. Hence the faulted section of line will be cleared at station B by the opening of circuit breaker 16 from the closing of the contacts of residual overload relay 22.

The ground fault current in line section G at stations C and D would tend to operate relays 22 at these stations but this is avoided at station D by the closing of the contacts of residual directional relay 31, since ground fault current is flowing toward station D from line G. Closing of the contacts of relay 31 completes the circuit from power source 17 through lead 115, contacts 84, lead 82 through coil 84 and back to 18, the other side of the station power source. This closes the contacts of relay 29 which starts transmitter T through contacts 96 and 97 and operates relay 30 through contacts 98 and 99. Relay 30 closes and shorts out relays 19, 20, 21 and 22 thus preventing their operation and holding line section G in service at station D. The signal transmitted by T at station D is received by R at station C which closes its contacts connecting 102 and 103 energizing the coil of relay 30 which operates and short circuits relays 19, 20, 21 and 22 preventing the closing of their contacts and holding line section G in service at station C.

V. In the case of the phase to ground fault with low fault resistance, both the residual directional and three phase power directional relays are either closed or open their contacts alike at the respective stations as determined by the direction of power flow and ground fault current flow which will be the same in direction for the low resistance ground fault. The action of the protective scheme at the various stations will be exactly the same as previously described from this point on.

Having described only typical preferred forms and applications of our invention, we do not wish to limit ourselves to the specific details set forth, but wish to reserve to ourselves any changes or variations that may appear to those skilled in the art or fall within the scope of the following claims:

Having described our invention, we claim:

1. A protective system for a sectional current carrying line including, protective units connected with each end of a line section and each including a circuit breaker controlling the line, an overload time delay trip relay controlling the breaker, the relay having a closing coil and a restraining coil, means connecting the coils of said relay with a section of the line whereby the relay is directly responsive to overcurrent in the line other than balanced overcurrent, and cut out means for the relay, and means connected with the said line section whereby the cut out means of a unit is operated upon overcurrent flow in a single direction in said section of the line.

2. A protective system for a sectional multiphase current carrying line including, protective units connected with each end of a line section and each including, a circuit breaker controlling the line, a plurality of overload time delay trip relays controlling the breaker, each relay having a closing coil and a restraining coil, connecting means between each phase of the line and the coils of a trip relay whereby a trip relay is operated upon unbalanced overcurrent flow of predetermined duration on the line, and cut out means for the trip relays, and means connected with said line section and the cut out means of the units connected with said line section whereby the cut-out means of a unit is immediately operated upon overcurrent flow in a single direction.

3. A protective system for a sectional multiphase current carrying line including, protective units connected with each end of a line section and each including, a circuit breaker controlling the line, a plurality of trip relays controlling the breaker, each relay having a closing coil and a restraining coil, connecting means between each phase of the line and the coils of a trip relay whereby a trip relay is operated upon unbalanced overcurrent flow of predetermined duration on the line, and cut out means for the trip relays, and means connected with said line section and the cut out means of the units connected with said line section whereby the cut-out means of a unit is immediately operated upon overcurrent flow in a single direction.

4. A protective system for a sectional multiphase current carrying line including, protective units connected with each end of a line section and each including, a circuit breaker controlling the line, a plurality of trip relays controlling the breaker, each relay having a closing coil and a restraining coil, connecting means between each phase of the line and the coils of a trip relay whereby a trip relay is directly operated upon unbalanced overcurrent flow of predetermined duration on the line, and cut out means for the trip relays, and means connected with said line section and the cut out means of the units connected with said line section whereby the cut-out means of a unit is immediately operated upon overcurrent flow in a single direction.

5. A protective system for a sectional current carrying line including, a protective units connected with each end of a line section and each including a circuit breaker controlling the line, an overload trip relay controlling the breaker, the relay having a closing coil and a restraining coil, means connecting the coils of said relay with a section of the line whereby the relay is directly responsive to overcurrent in the line other than balanced overcurrent, and cut out means for the relay, and means connected with the said line section whereby the cut out means of a unit is operated upon overcurrent flow in a single direction in said section of the line.

6. A protective system for a sectional current carrying line including, protective units connected with each end of a line section and each including a circuit breaker controlling the line, an overload trip relay controlling the breaker, the relay having a closing coil and a restraining coil, means connecting the coils of said relay with a section of the line whereby the relay is directly responsive to overcurrent in the line other than balance overcurrent, means for retarding the action of the relay, and cut out means for the relay, and means connected with the said line section whereby the cut out means of a unit is operated upon overcurrent flow in a single direction in said section of the line.

LLOYD F. HUNT.
FRED B. DOOLITTLE.